United States Patent [19]

Haase

[11] 4,227,492
[45] Oct. 14, 1980

[54] INTAKE MANIFOLD FOR A VERTICAL SHAFT ENGINE

[75] Inventor: Elmer A. Haase, South Bend, Ind.

[73] Assignee: The Bendix Corporation, Southfield, Mich.

[21] Appl. No.: 50,911

[22] Filed: Jun. 21, 1979

[51] Int. Cl.³ .......... F24C 1/16; F24C 15/28; F24B 13/04; F24C 15/00
[52] U.S. Cl. .......... 123/59 B; 123/52 M; 123/73 R; 123/73 A; 123/55 R; 123/445; 123/470; 123/591
[58] Field of Search .......... 123/52 M, 29, 34 R, 123/73 R, 73 A, 139 AW, 59 B, 55 R, 55 VF, 55 VS, 55 VE, 55 AB

[56] References Cited

U.S. PATENT DOCUMENTS

| | | | |
|---|---|---|---|
| 2,630,791 | 3/1953 | Kiekhaefer | 123/59 B |
| 2,643,510 | 6/1953 | Kiekhaefer | 123/59 B |
| 3,020,707 | 2/1962 | Post et al. | 123/73 A |
| 3,269,374 | 8/1966 | Conover | 123/59 B |
| 3,851,631 | 12/1974 | Kiekhaefer | 123/73 R |
| 4,079,706 | 3/1978 | Konig | 123/59 B |

Primary Examiner—Wendell E. Burns
Attorney, Agent, or Firm—Leo H. McCormick, Jr.; Ken C. Decker

[57] ABSTRACT

A manifold system for a two stroke cycle vertical shaft internal combustion engine. A series of horizontal bores are perpendicular to the vertical shaft. A piston located in each bore establishes a combustion chamber and a fuel-air mixture supply chamber therein. A passage connects the supply chamber to the combustion chamber and a manifold system connects the supply chamber to a mixing chamber. Each mixing chamber is connected to an independent fuel supply and to a common air supply. A valve is located between the mixing chamber and the supply chamber to control the communication of a fuel-air mixture between the mixing chamber and the supply chamber. When the piston moves toward the combustion chamber a fuel-air mixture therein is compressed and at the top of the stroke ignited to produce combustion. As the piston moves toward the combustion chamber, the supply chamber expands and draws in a fuel-air mixture. When combustion occurs, the piston moves toward the supply chamber causing the valve to close and compress the fuel-air mixture now in the supply chamber. After the piston has travelled a predetermined distance, the combustion chamber is communicated to the surrounding environment and the passages opened to allow the fuel-air mixture therein to flow into the combustion chamber. At the bottom of the exhaust stroke, the piston again moves toward the combustion chamber to initiate the compression stroke in a cycle of operation. In order to assure that the fuel-air ratio of the mixture supplied to each supply chamber is substantially identical a dam is located between the mixing chamber and the common air supply. The dam intercepts and retains any fuel delivered to the mixing chamber but not communicated into the supply chamber thereby preventing fuel from adjacent mixing chambers being intermingled during a compression stroke. Thus, the fuel-air ratio for each piston remains substantially constant for each piston in this internal combustion engine.

7 Claims, 2 Drawing Figures

INTAKE MANIFOLD FOR A VERTICAL SHAFT ENGINE

BACKGROUND OF THE INVENTION

This invention relates to a manifold system for a vertical shaft internal combustion engine.

Current manifolds for vertical shaft internal combustion engines have air inlet ports that are aligned with individual fuel nozzles to provide a supply chamber for each piston with a fuel air mixture. The fuel air mixture is communicated to a combustion chamber and when ignited moves a piston to provide the vertical shaft with rotative torque.

Normally a reed valve is located between the supply chamber and the fuel and air supplied to control the flow of the fuel air mixture into each supply chamber. Unfortunately, reed valves cannot close as rapidly as the combination moves the piston resulting in blow out of the fuel air mixture into the common air supply. This blow out fuel air mixture is added to the air intake of fuel air mixture that is supplied to the combustion chamber of an adjacent or lower piston. It has been found that the upper combustion chambers are receiving a leaner fuel air mixture and the lower chambers are receiving a richer fuel air mixture than the optimum fuel air mixture required by the internal combustion engine. This is most noticeable when such a vertical shaft internal combustion engine is operating at its idle speed since combustion reactive force for each piston is different, the engine operation is not smooth.

SUMMARY OF THE INVENTION

I have developed a manifold system for a vertical shaft internal combustion engine wherein the fuel supplied to a cylinder is retained in a mixing chamber adjacent to the fuel air supply chamber to prevent communication of fuel between adjacent cylinders and thereby maintain a substantially uniform ratio of the fuel/air mixture supplied to each cylinder.

The manifold system has a housing with an air inlet passage which is connected to each supply chamber through individual mixing chambers associated with each cylinder. Each mixing chamber has an apron which slopes from an air inlet port toward the supply chamber. A fuel nozzle in each chamber directs fuel from a source to the center of the reed valve between the mixing chamber and the supply chamber.

During the operation of the internal combustion engine any blow out of fuel caused by the failure of the reed valves to simultaneously close as the piston initiates its power stroke is retained by the slope on the apron. In addition a ledge which forms part of the air inlet port forms a dam to provide additional retention of fuel in each mixing chamber to assure that the fuel supplied to each cylinder is utilized by only that cylinder.

Depending on the rotational speed of the vertical shaft, the fuel supplied to each nozzle can be modified to assure that an optimum fuel-to-air ratio is present. Thus, with each cylinder providing an equal input to the rotative torque of the shaft, the most efficient use of fuel in this type of internal combustion engine is obtained.

It is an advantage of this invention to provide for retention of the fuel supplied to each cylinder in a vertical shaft internal combustion engine and thereby prevent intermingling of fuel between adjacent cylinders which could adversely affect the optimum fuel-to-air ratio of the fuel mixture supplied to the combustion chamber in each cylinder.

Another advantage of this invention results in a smooth operating vertical shaft internal combustion engine at idle speed since the fuel supplied to each cylinder is only used in that individual cylinder to provide the combustive force for moving a piston attached to the vertical shaft.

Still another advantage of this invention is to provide a manifold system through which the fuel-to-air ratio of each cylinder in a vertical shaft internal combustion engine is maintained throughout the operational range of the rotative output from the vertical shaft.

These advantages and others should be evident from reading this specification and viewing the drawings.

DETAILED DESCRIPTION OF THE INVENTION

Figure 1:
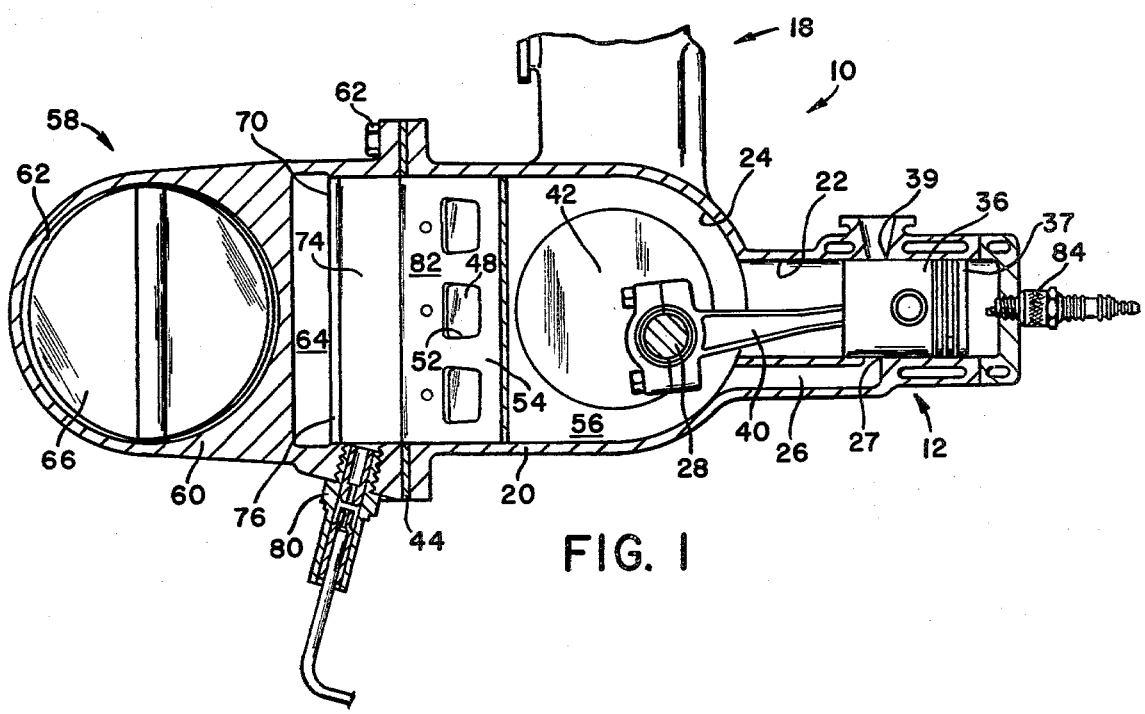
FIG. 1 is a top sectional view of a two stroke vertical shaft internal combustion engine having a manifold system made according to the principles of this invention.
Figure 2:
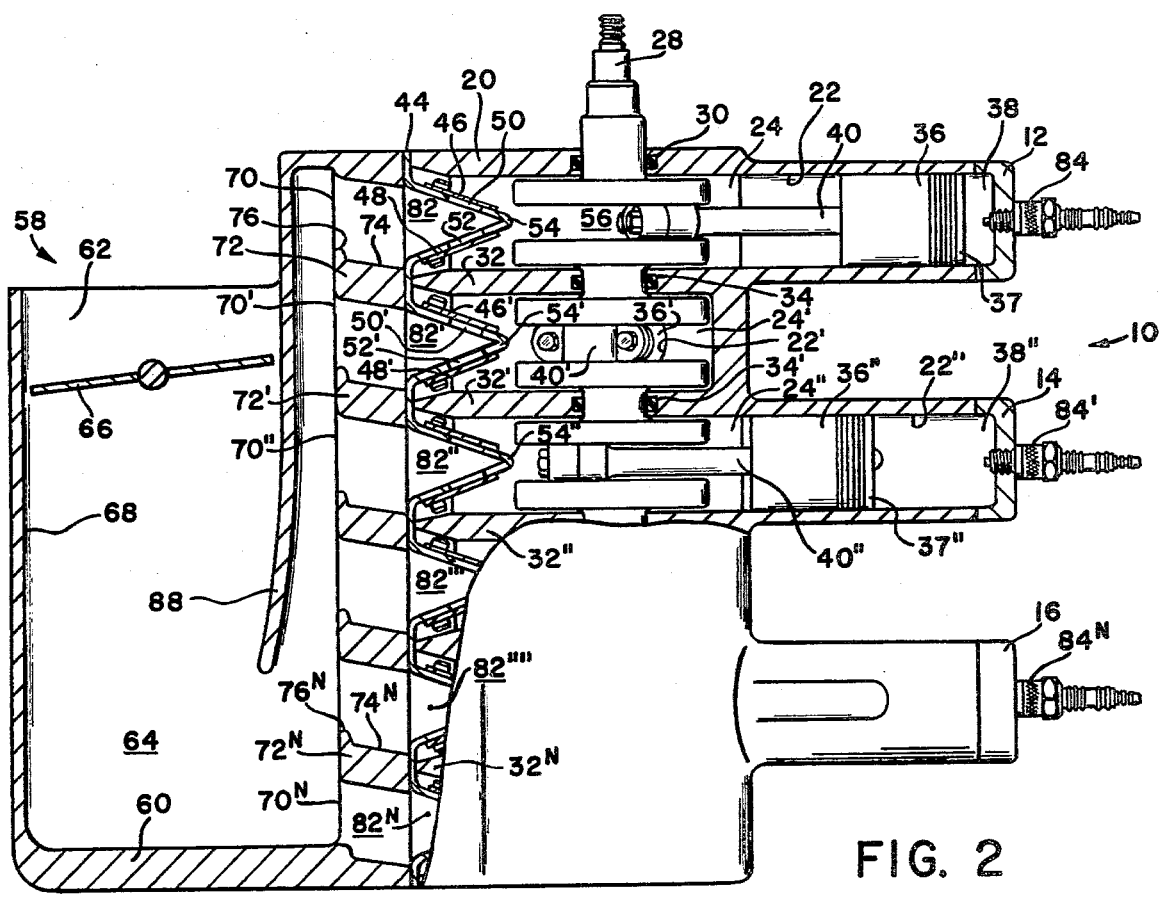
FIG. 2 is a side sectional view of the internal combustion engine of FIG. 1.

The internal combustion engine 10 shown in FIG. 1 has a central housing 20 with a first bank of cylinders 12, 14 and 16, shown in FIG. 2, extending therefrom which are located at substantially 90° to a corresponding second bank of cylinders of which only 18 is shown. Each cylinder has a bore $22, 22' \ldots 22^N$ that extends from a central cavity $24, 24' \ldots 24^N$ in housing 20 and a passage $26 \ldots 26^N$, only one is shown in FIG. 1, that connects the central cavity $24 \ldots 24^N$ with bore $22 \ldots 22^N$. Bearing walls $32 \ldots 32^N$ extend from the side walls of housing 20 to separate the individual control cavities $24, 24' \ldots 24^N$ from each other. A crank shaft which is perpendicular to the cylinders 12, 14, 16, 18, etc. is fixed in housing 20 by end bearing and seal 30, only one is shown in FIG. 2, and to the bearing wall $32, 32' \ldots 32^N$ by bearing seals $34, 34' \ldots 34^N$. Each cylinder 12, 14, 16, 18, etc. has a piston $36, 36' \ldots 36^N$ that moves in a corresponding bore $22, 22' \ldots 22^N$ to separate a combustion chamber $38 \ldots 38^N$ form the central cavity $24, 24' \ldots 24^N$. Each piston $36 \ldots 36^N$ is connected to the vertical shaft 28 by a connecting rod $40, 40' \ldots 40^N$ are eccentrically located with respect to the axial center 42 of the shaft 28 in order that pistons $36, 36' \ldots 36^N$ are sequentially positioned in cylinders 12, 14, 16, 18 etc.

A control valve consisting of a corrugated housing 44 with a series of reed valves having flapper members $46, 46' \ldots 46^N$ and $48, 48' \ldots 48^N$ located over openings $50, 50' \ldots 50^N$ and $52, 52' \ldots 52^N$.

The individual corrugated sections $54, 54' \ldots 54^N$ extend into central cavities $24, 24' \ldots 24^N$ to define therewith a supply chamber $56, 56' \ldots 56^N$ for each cylinder 12, 14, 16, 18 etc.

Bolts 62, only one of which is shown, engage housing 60 of a manifold system 58 to hold the corrugated housing 44 against housing 20 to establish a seal between the supply chambers $56, 56' \ldots 56^N$ and the surrounding environment.

The housing 60 has an air passage 62 through which air form the surrounding environment is communicated into air supply chamber 64. A butterfly valve 66 which is responsive to an operator input is located in the throat section 68 of the air passage 62 to control the flow of air into the air supply chamber 64. The air supply chamber is connected to the control valve through a series of air inlet ports 70, 70' ... 70$^N$.

The air inlet ports 70, 70' ... 70$^N$ are separated from each other by plates 72, 72' ... 72$^N$. Plates 72, 72' ... 72$^N$ have a surface 74, 74' ... 74$^N$ that slopes toward the bearing walls 32, 32' ... 32$^N$.

In addition, lips 76, 76' ... 76$^N$ extend from surfaces 74, 74' ... 74$^N$ to form a dam for the retention of any fuel that may be presented by each nozzle 80, only one being shown, to each cylinder 12, 14, 16, 18, etc.

Each nozzle 80 is attached to housing 60 and aligned such that fuel is directed to the center of the reed valves in the control valve. Thus, when the flappers are open, fuel can flow into the supply chamber without being channelized by the side wall of either housing 60 or 20.

MODE OF OPERATION OF THE INVENTION

The vertical shaft 28 in the internal combustion engine 10 shown in FIGS. 1 and 2 is provided with rotary motion through the linear movement of pistons 36, 36' ... 36$^N$ in the cylinders 12, 14, 16, 18 etc. The connecting rod 40, 40' ... 40$^N$ associated with pistons 36, 36' ... 36$^N$ are attached to the vertical shaft 28 such that when one piston is at the top of its stroke, another piston is at the bottom of its stroke and the remaining pistons are proportionally located in between the top and bottom of their respective strokes.

On each intake stroke for each piston 36, fuel which is supplied to area 82 in the center of the individual corrugations 54 of the control valve is mixed with air from the storage chamber or plenum 64 and drawn into the supply chamber 56 through openings 50 and 52 past the flappers 46 and 48. When piston 36 reaches the top of its stroke as shown in FIG. 2, the fuel air mixture in the combustion chamber 38 is compressed to a predetermined volume. Thereafter, spark plug 84 is provided with an electrical charge which causes the fuel-air mixture to equate and provide a combustion force that moves piston 36 toward the supply chamber 56. As piston 36 moves in bore 22, a small volume of the fuel-air mixture known as blow out in the supply chamber passes through openings 50 and 52 before flappers 46 and 48 are seated on the corrugated section 54. Even though the blow out fuel-air mixture is atomized, droplets form and are deposited on an apron or surface 74.

The slope of surface 74 and lip 76 hold such droplets and any fuel which may be communicated through nozzle 80 after the piston 36 reaches the top of the stroke. Thus substantially all the fuel which is supplied to cylinder 12 is retained for use therewith in providing a desired fuel-air ratio of the combustible mixture supplied to chamber 38.

When flappers 46 and 48 are closed, movement of piston 36 toward chamber 56 compresses the fuel-air mixture therein as the combustion chamber 38 expands. When lip 37 of piston 36 reaches the exhaust port 39, the combusted mixture flows to the surrounding environment. Further movement of piston 36 moves lip 32 past intake port 27 to allow communication between the supply chamber 56 and the combustion chamber 38. The compressed fuel-air mixture in the supply chamber flows through the intake port 27 and displaces the combusted mixture as it flows to the surrounding environment. When piston 36 reaches the bottom of its stroke, a set charge of the combustible mixture having a selected fuel-to-air ratio has been communicated into the combustion chamber 38.

Thereafter, piston 36 moves toward the combustion chamber 38. As piston 36 moves from the bottom of its stroke, the pressure in the supply chamber 56 drops and when lip 37 reaches the intake port, the pressure in the supply chamber 56 and combustion chamber 38 are substantially equal. As piston 36 moves past the intake port 22 and exhaust port 39, the pressure in the supply chamber 56 is lowered causing the flappers 46 and 48 to open and permit the fuel-air mixture in area 82 to flow into the supply chamber 56 until piston 36 reaches the top of its stroke where ignition occurs to complete a cycle of the shaft 28.

The combustive force of the fuel-air mixture in each chamber 38, 38' ... 38$^N$ acts on the pistons 36, 36' ... 36$^N$ associated therewith to provide a linear force which causes the vertical shaft to rotate at a substantially uniform angular speed. Since the speed of the vertical shaft can vary from a few hundred revolutions per minute to several thousand revolutions per minute in order for this uniform angular speed to be maintained over the entire operational range it is necessary that the same fuel-to-air ratio be maintained in each cylinder 12, 14, 16, 18 etc. The lip 76 and sloping apron or surface 74 associated with each cylinder provides a sufficient restriction to retain the fuel presented thereto through nozzles 80 even with air flow through some of the adjacent air inlets 70', 70'' ... 70$^N$. However, in order to assure that no fuel is expelled from the manifold 58, a baffel 88 is located in the air chamber 64 to deflect any fuel away from passage 62. It should be noted that the distance between the air inlets ports and baffel 88 varies in order that air flow is not restricted to the cylinder 12, 14, 16, 18 etc. Thus, the manifold system 58 assures that all the fuel supplied to each individual cylinder is utilized in that cylinder alone to provide an operational force to rotate the vertical shaft 28.

I claim:

1. In a two stroke cycle vertical shaft internal combustion engine having a series of horizontal bores, each bore having an entrance port and an exhaust port, a piston located in each bore to establish a combustion chamber and a fuel-air mixture supply chamber, said entrance port being connected to said supply chamber, a manifold system establishes a mixing chamber adjacent to each supply chamber, each mixing chamber being connected to an inedpendent fuel supply and to a common air supply, and a control valve located between each mixing and supply chamber to allow a fuel-air mixture to enter the supply chamber on movement of the piston toward the combustion chamber and to prevent communication from the mixing chamber to the supply chamber on movement of the piston toward the supply chamber and allow the fuel-air mixture in the supply chamber to flow through the entrance port into the combustion chamber when the piston has moved a predetermined distance, the improvement comprising:

means in each mixing chamber for retaining fuel to prevent communication of fuel between adjacent mixing chambers when a control valve allows the fuel-air mixture to flow into a supply chamber and thereby maintain a substantially uniform fuel-air ratio of each supply chamber.

2. In the internal combustion engine as recited in claim 1 wherein said manifold system includes:

a housing having an air passage therethrough with individual inlet air ports for each mixing chamber; and a baffle connected to said housing for intercepting atomized fuel and thereby prevent fuel from being communicated through the air passage to the atmosphere.

3. In the internal combustion engine as recited in claim 2 further including:

a fuel supply nozzle for each mixing chamber, said nozzle being aligned to direct fuel into the center of the control valve.

4. In the internal combustion engine as recited in claim 3 wherein said retaining means includes:

an apron that extends from each control valve to each air port, each apron having a slope thereon from the air inlet port toward the control valve, said slope preventing fuel from flowing through the air inlet port into the air distribution passage.

5. In the internal combustion engine as recited in claim 4 wherein said retaining means further includes:

a lip attached to said apron to form a dam for retaining a still greater volume of fuel.

6. In the internal combustion engine as recited in claim 3 wherein said retaining means includes:

a restriction connected to said housing and forming a part of the air inlet port, said restriction retaining fuel in said mixing chamber when the control valve associated therewith is closed while allowing air to freely flow into the mixing chamber when the control valve is opened.

7. In the internal combustion engine as recited in claim 3 wherein said retaining means inhibits the blow out of fuel through the air inlet ports during the time period that it takes the control valve to transition from the open position to the closed position.

* * * * *